(12) United States Patent
Selby

(10) Patent No.: US 6,439,615 B1
(45) Date of Patent: Aug. 27, 2002

(54) ADAPTOR FOR A SAFETY HOSE

(75) Inventor: William J. Selby, Stoughton, MA (US)

(73) Assignee: Samar Company, Inc., Stoughton, MA (US)

( * ) Notice: Subject to any disclaimer, the term of this patent is extended or adjusted under 35 U.S.C. 154(b) by 0 days.

(21) Appl. No.: 09/613,676

(22) Filed: Jul. 11, 2000

(51) Int. Cl.⁷ .............................................. F16L 45/00
(52) U.S. Cl. .................................. 285/131.1; 285/125.1
(58) Field of Search .......................... 285/125.1, 127.2, 285/128.1, 129.1, 129.2, 131.1; 549/560; 226/38

(56) References Cited

U.S. PATENT DOCUMENTS

| | | | | | |
|---|---|---|---|---|---|
| 1,093,626 A | * | 4/1914 | Hulbert | .................... | 285/125.1 |
| 1,356,373 A | * | 10/1920 | Kersten | .................... | 285/125.1 |
| 1,759,321 A | * | 5/1930 | Oldfield | .................... | 285/125.1 |
| 1,911,454 A | * | 5/1933 | Luff | ......................... | 285/129.2 |
| 2,379,669 A | * | 7/1945 | Warren | ................. | 285/125.1 X |
| 2,567,165 A | * | 9/1951 | Buskirk | ........................ | 226/38 |
| 3,291,670 A | * | 12/1966 | Usab | ........................... | 549/560 |
| 3,736,955 A | * | 6/1973 | Schlesser | ............. | 285/125.1 X |
| 5,080,740 A | * | 1/1992 | Burba et al. | ......... | 285/125.1 X |

* cited by examiner

Primary Examiner—Paul N. Dickson
Assistant Examiner—Melanie Torres
(74) Attorney, Agent, or Firm—Steven N. Fox, Esq.

(57) ABSTRACT

The present invention is an adapter for use with a washer machine having a water discharge system having a main drain conduit and a water inlet system having first and second secondary drain conduits and a drain pipe. In one embodiment, the adapter comprises a body portion comprising a primary inlet portion, a primary outlet portion, and first and second secondary inlet portions. The primary inlet portion is in fluid communication with the primary outlet portion. The first and second secondary inlet portions are in fluid communication with the primary outlet portion. The primary inlet portion is adapted to receive the main drain conduit. The primary outlet portion is adapted to receive the first and second secondary drain conduits.

7 Claims, 3 Drawing Sheets

ADAPTOR FOR A SAFETY HOSE

BACKGROUND OF THE INVENTION

Most washer machines have a hot water and cold water inlet pipe which are connected by safety hoses to the hot and cold water sources. Such washer machines also have a drain hose that is connected to a drain pipe to discharge both the hot and cold water. Such safety hoses are designed with a containment chamber that is adapted to retain any water leaking from the hot water hose. Such safety hoses include one or more drain hoses in communication with the containment chamber of the safety hose. Most residential homes are designed with a single drain vertical pipe. The drain hose of the washer machine and the drain hose of the safety hose system are inserted into a single drain pipe to thereby discharge the hot and cold water. Such safety hose systems and drain pipes are not without their drawbacks. Principally, conventional drain pipes have only a single opening to receive the primary drain hose and the secondary drain hoses of the safety hose system. In some cases, it is difficult for the user to insert the drain hose and the secondary drain hoses of the safety hose system into the single opening of the drain pipe. Moreover, it is possible for the drain hose and the secondary drain hoses of the safety hose system to become disengaged from the single opening of the drain pipe thereby causing water to be discharged onto the floor surrounding the washer machine.

SUMMARY OF THE INVENTION

The present invention is an adapter for use with a washer machine having a water discharge system having a main drain conduit and a water inlet system having first and second secondary drain conduits and a drain pipe. In one embodiment, the adapter comprises a body portion comprising a primary inlet portion, a primary outlet portion, and first and second secondary inlet portions. The primary inlet portion is in fluid communication with the primary outlet portion. The first and second secondary inlet portions are in fluid communication with the primary outlet portion. The primary inlet portion is adapted to receive the main drain conduit. The primary outlet portion is adapted to receive the drain pipe.

BRIEF DESCRIPTION OF THE DRAWINGS

The following detailed description of the invention will be better understood with reference to the accompanying drawings in which.

DETAILED DESCRIPTION OF THE INVENTION

Figure 1:
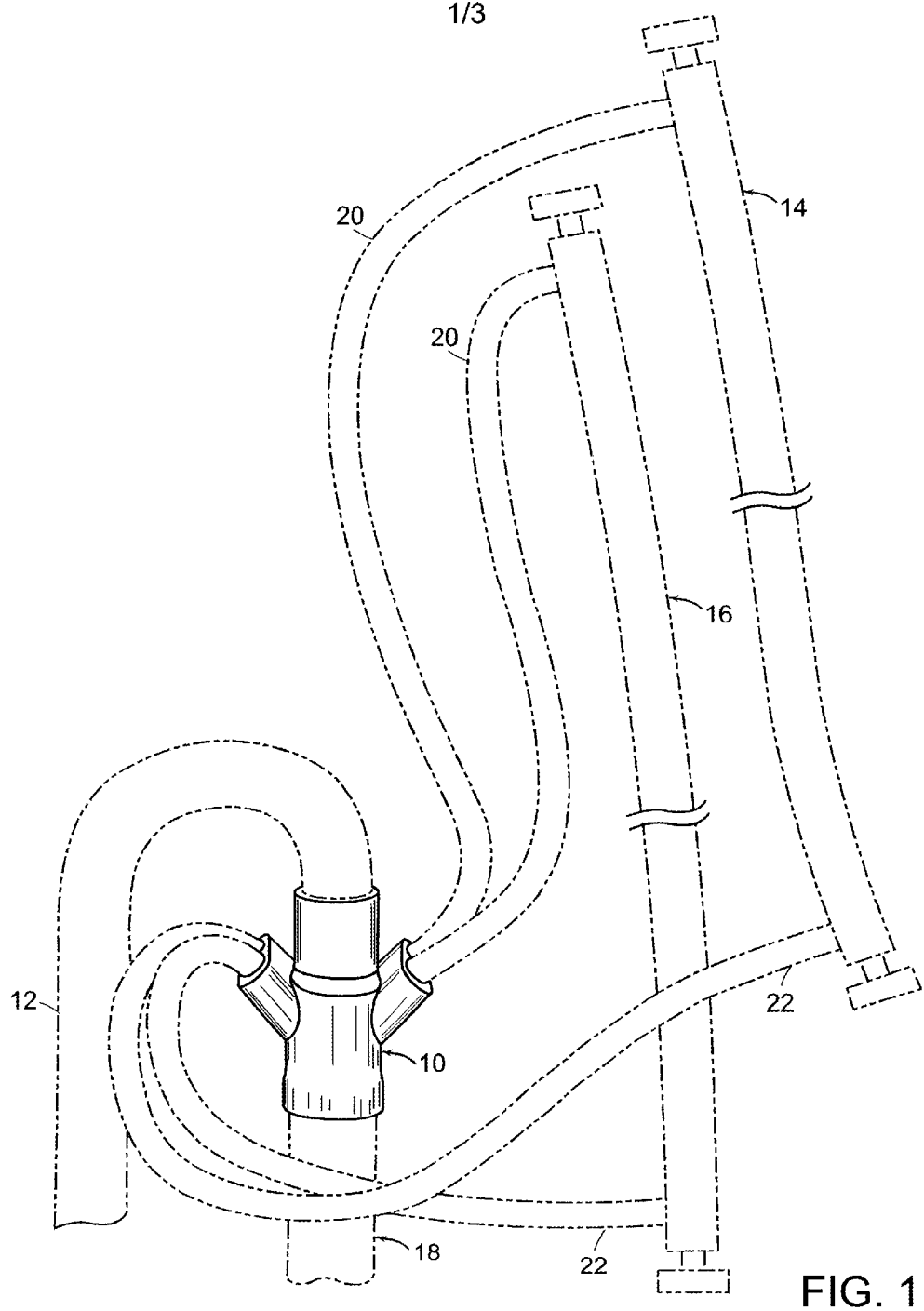
FIG. 1 is a perspective view of the adaptor of present invention in operable connection with a washer machine, first and second safety hose systems, and a drain pipe.

Referring to FIG. 1, wherein an adaptor 10 of the present invention is shown in operable connection with a primary drain conduit 12 of a washer machine (not shown), and first and second inlet water conduit systems or second safety hose systems 14 and 16, and a drain pipe 18. Each of the safety hose systems 14 and 16 comprise first and second secondary drain conduits 20 and 22.

Figure 2:
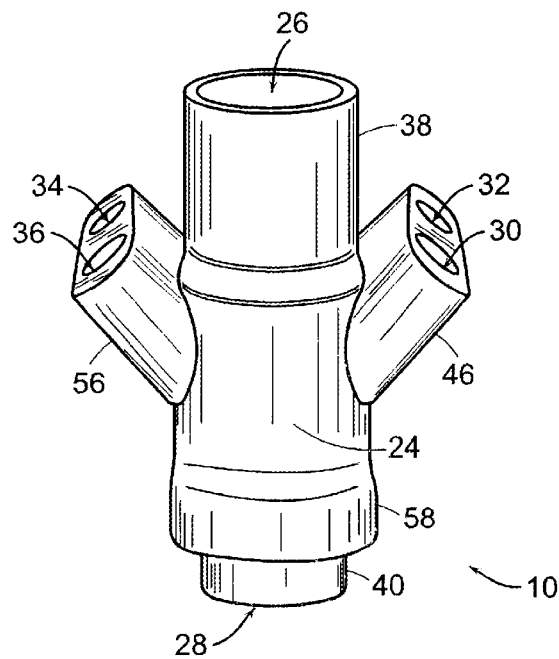
FIG. 2 is a perspective view of the adaptor.
Figure 3:
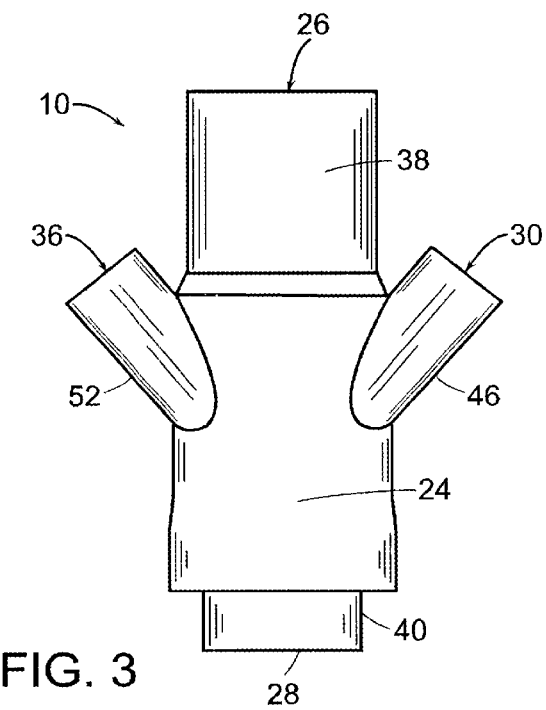
FIG. 3 is a front elevation view of the adaptor.
Figure 4:
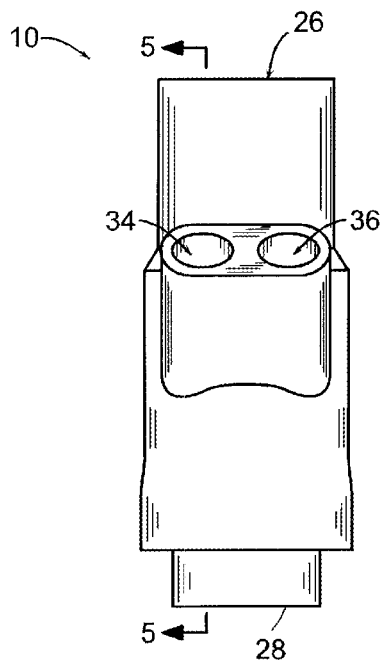
FIG. 4 is a side elevation view of the adaptor.
Figure 5:
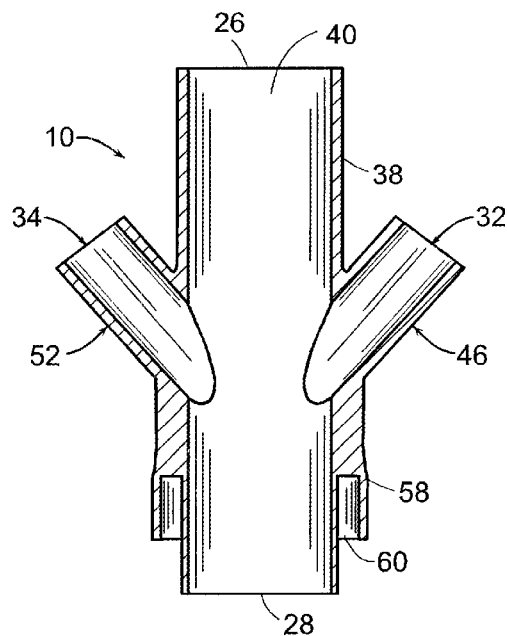
FIG. 5 is a cross section view of the adaptor.
Figure 6:
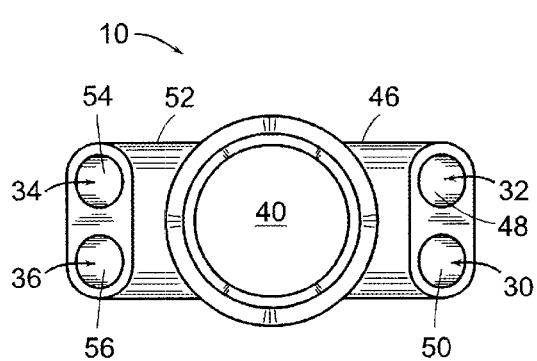
FIG. 6 is a top plan view of the adaptor.
Figure 7:
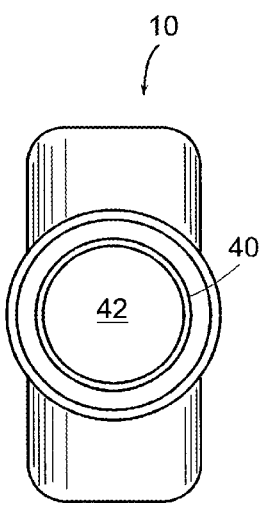
FIG. 7 is a bottom plan view of the adaptor.

Referring to FIG. 2, the adaptor 10 comprises a body portion 24 having a primary inlet portion 26, a primary outlet portion 28, and first and second secondary inlet portions 30 and 32. The primary inlet portion 26 is in fluid communication with said primary outlet portion 28. The first and second secondary inlet portions 30 and 32 are in fluid communication with the primary outlet portion 28. The adaptor 10 may also comprise third and fourth secondary inlet portions 34 and 36 in fluid communication with the primary outlet portion 28. The primary inlet portion 26 is adapted to receive the main drain conduit 12. The primary outlet portion 28 is adapted to engage with the drain pipe 18. The primary inlet portion 26 comprises an elongated upper end portion 38 having an opening 40 adapted to receive the main drain conduit 12. The primary outlet portion 28 comprises an elongated lower end portion 42 having an opening 44 adapted to engage within the drain pipe 18. Each of the first and second secondary inlet portions 30 and 32 are formed as part of an elongated side portion 46 having openings 48 and 50. Each of the first and second secondary inlet portions 32 and 34 are formed as part of an elongated side portion 52 having openings 54 and 56. The openings 48, 50, 54, and 56 are adapted to receive the first and second secondary drain conduits 20 and 22 of hose systems 14 and 16. In the embodiment shown, the secondary drain conduits 20 and 22 of the hose system 14 are inserted within the openings 48 and 54 while the secondary drain conduits 20 and 22 of the hose system 16 are inserted within the openings 50 and 56. Each of the openings 48 and 50 of the elongated side portion 46 and openings 54 and 56 of the elongated side portion 52 are of cylindrical shape and have a diameter sized to receive the secondary drain conduits 20 and 22. The opening 40 of the elongated upper portion 38 is of cylindrical shape and has a diameter sized to receive the primary drain conduit 12. The opening 42 of the elongated lower portion 38 is of cylindrical shape and has an outside diameter sized to be inserted into the drain pipe 18. The elongated upper portion 38 is of cylindrical shape. The elongated lower portion 28 is of cylindrical shape and adapted to be inserted within the drain pipe 18. Each of the elongated side portions 46 and 52 are of cylindrical shape. The main body portion 24 further comprises a lower outside portion 58 disposed coaxially and about the lower end portion 40 to form a channel or recess portion 60. The recess portion 60 is adapted to engage with the wall 62 of the drain pipe 18. The body portion 24 may be made from a variety of rigid epoxy resins and constructed from conventional injection molding processes.

What is claimed:

1. An adapter for use with a washer machine having a main drain conduit, a safety hose system having first and second secondary drain conduits, and a plumbing system having a drain pipe, the adapter comprising:

(a) a body portion comprising a primary inlet portion, a primary outlet portion, and first and second secondary inlet portions;

(b) said primary inlet portion being in fluid communication with said primary outlet portion, said primary inlet portion having an opening to receive the main drain conduit of the washing machine;

(c) said first and second secondary inlet portions being in fluid communication with said primary outlet portion, each of said first and second secondary inlet portions having an opening to receive the first and second secondary drain conduits of the safety hose system, said openings of said first and second secondary inlet portions are substantially smaller than said opening of said primary inlet portion; and (d) said primary outlet portion being adapted to engage with the drain pipe of the plumbing system.

2. The adapter of claim 1, wherein said opening of said first secondary inlet portion is spaced adjacent to and a small distance from said opening of said second secondary inlet portion.

3. The adapter of claim 2, wherein said first and second secondary inlet portions are formed as part of a single elongated housing portion having a wall separating said first secondary inlet portion from said second secondary inlet portion.

4. The adaptor of claim 3, wherein said body portion comprises third and fourth secondary inlet portions, each of said third and fourth secondary inlet portions being in communication with said primary outlet portion.

5. The adaptor of claim 4, wherein said primary inlet portion has a cylindrically shaped channel.

6. The adaptor of claim 5, wherein said first and second secondary inlet portions each has a cylindrically shaped channel.

7. The adaptor of claim 6, wherein said cylindrically shaped channel of said secondary inlet portion is substantially parallel to said cylindrically shaped channels of said first and second secondary inlet portions.

* * * * *